United States Patent
Noda et al.

(10) Patent No.: US 8,177,387 B2
(45) Date of Patent: May 15, 2012

(54) TOOLBOX STRUCTURE OF CONSTRUCTION MACHINE

(75) Inventors: Tsuyoshi Noda, Hiroshima (JP); Hiroshi Kanamaru, Hiroshima (JP)

(73) Assignee: Konelco Construction Machinery Co., Ltd., Hiroshima-shi (JP)

( * ) Notice: Subject to any disclaimer, the term of this patent is extended or adjusted under 35 U.S.C. 154(b) by 166 days.

(21) Appl. No.: 12/692,948

(22) Filed: Jan. 25, 2010

(65) Prior Publication Data

US 2010/0206927 A1   Aug. 19, 2010

(30) Foreign Application Priority Data

Feb. 13, 2009   (JP) ................................ 2009-031554

(51) Int. Cl.
| | |
|---|---|
| F21V 33/00 | (2006.01) |
| A45C 15/06 | (2006.01) |
| B60R 3/00 | (2006.01) |
| B60R 7/00 | (2006.01) |
| B62D 33/00 | (2006.01) |
| B62D 33/04 | (2006.01) |

(52) U.S. Cl. ........ 362/154; 362/156; 362/496; 280/163; 296/182.1; 224/401

(58) Field of Classification Search .................. 362/154, 362/156, 496; 280/163, 164.1; 296/182.1; 224/401
See application file for complete search history.

(56) References Cited

U.S. PATENT DOCUMENTS

| | | | | |
|---|---|---|---|---|
| 3,573,452 | A * | 4/1971 | Kenyon et al. | 362/294 |
| 3,987,295 | A * | 10/1976 | Vena | 362/96 |
| 4,770,330 | A * | 9/1988 | Bonstead et al. | 224/404 |
| 5,624,029 | A * | 4/1997 | Shih | 206/372 |
| 5,651,606 | A * | 7/1997 | Krogman | 362/96 |
| 5,848,744 | A * | 12/1998 | Dischner et al. | 224/404 |
| 6,981,780 | B2 * | 1/2006 | Einav | 362/154 |
| 7,055,983 | B1 * | 6/2006 | Baker et al. | 362/154 |
| 7,182,488 | B2 * | 2/2007 | Hsu | 362/373 |
| 7,347,597 | B2 * | 3/2008 | French | 362/485 |
| 7,722,308 | B2 * | 5/2010 | Sakitani et al. | 414/680 |
| 7,780,213 | B2 * | 8/2010 | Kim | 296/37.6 |
| 7,988,167 | B2 * | 8/2011 | Sakitani et al. | 280/163 |
| 2006/0091637 | A1 * | 5/2006 | Knittel | 280/163 |

FOREIGN PATENT DOCUMENTS

| | | |
|---|---|---|
| JP | 9-175253 | 7/1997 |
| JP | 2001-262624 | 9/2001 |

* cited by examiner

*Primary Examiner* — Jong-Suk (James) Lee
*Assistant Examiner* — David J Makiya
(74) *Attorney, Agent, or Firm* — Oblon, Spivak, McClelland, Maier & Neustadt, L.L.P.

(57) ABSTRACT

An illumination device is installed in a box body of a toolbox of a construction machine, and is protected by a protective cover. Water that flows into the box body through a weep hole formed in a lid is received by the protective cover and is guided to a water drain hole formed in a bottom plate of the box body. Then, the water is drained to the outside of the box body.

7 Claims, 7 Drawing Sheets

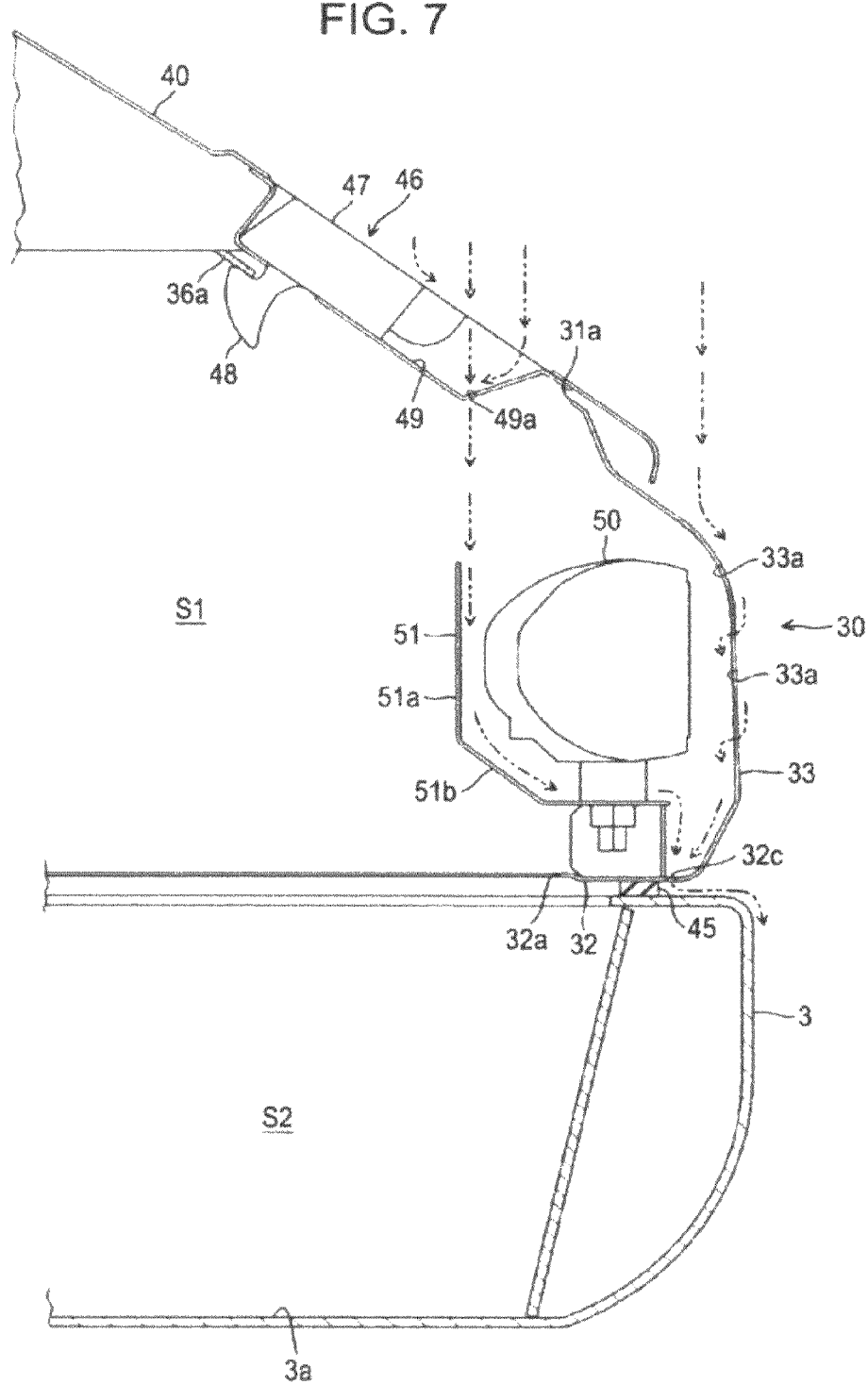

TOOLBOX STRUCTURE OF CONSTRUCTION MACHINE

BACKGROUND OF THE INVENTION

1. Field of the Invention

The present invention relates to a toolbox structure of a construction machine.

2. Description of the Related Art

A construction machine, such as a hydraulic excavator, includes a toolbox on a main frame so that various tools can be stored in the toolbox. For example, Japanese Unexamined Patent Application Publication No. 2001-262624 discloses a toolbox structure including a box body and a lid body. The box body has a storage space therein and is provided with an opening formed in an upper section of the box body. The lid body can open or close the opening in the box body. The lid body is provided with a handle that can be grabbed by an operator when the operator opens or closes the lid body. In this structure, a sealing member is provided between the box body and the lid body to prevent rainwater, washing water, etc., from flowing into the box body.

In addition, Japanese Unexamined Patent Application Publication No. 9-175253 discloses a toolbox structure in which an opening is formed in a bottom plate of a box body and the box body is placed on a main frame such that the opening communicates with the inside of the main frame, thereby increasing the capacity of the toolbox. In this structure, the lid body is provided with a lock mechanism which locks the lid body to the box body in a closed state.

In the structures according to the related art, the lock mechanism and the handle for opening and closing the lid body are disposed in a recessed section formed in the lid body so that they do not project from the surface of the lid body. Therefore, there is a possibility that rainwater or washing water will collect in the recessed section. If the water is in the recessed section when the operator opens the lid body, the hand of the operator will be wet, which causes discomfort to the operator.

In the case where an opening is provided in the bottom plate of the box body to increase the capacity of the toolbox, as in the toolbox structure described in Japanese Unexamined Patent Application Publication No. 9-175253, there is also a risk that rainwater, washing water, etc., will flow into the box body through the opening and a gap in a connecting section between the box body and the main frame. Therefore, if, for example, tools made of metal are stored in the box body, there is a risk that the tools will rust from exposure to the water that flows into the box body.

SUMMARY OF THE INVENTION

An object of the present invention is to provide a toolbox structure of a construction machine which is capable of draining water that collects on the top surface of a lid of a toolbox with a relatively simple structure and preventing water from flowing into the inner space through a bottom opening formed in the bottom plate of the box body.

According to the present invention, a weep hole is formed in the lid so that water that collects on the top surface of the lid flows into the box body, and the water is drained to the outside of the box body using a protective cover that covers an illumination device disposed in the box body.

More specifically, the present invention is applied to a toolbox structure including a box body provided on a main frame of a construction machine and a lid. The box body has a storage space therein and is provided with an opening formed in an upper section of the box body. The lid is capable of opening and closing the opening in the box body. According to the present invention, the following means are provided.

That is, according to the present invention, the toolbox structure includes an illumination device disposed in the box body and configured to emit light toward the outside of the box body and a protective cover disposed so as to cover the periphery of the illumination device and protect the illumination device. The box body includes a bottom plate in which a bottom opening and a water drain hole are formed, the bottom opening extending through the bottom plate in a thickness direction thereof, the water drain hole being formed at a position further toward the outside than a peripheral edge of the bottom opening. The box body is placed on the main frame with a sealing member interposed therebetween, the sealing member being disposed along the peripheral edge of the bottom opening at a position further toward the inside than the water drain hole. The lid is provided with a weep hole through which water that collects on a top surface of the lid flows into the box body. The protective cover is configured to guide the water that flows into the box body through the weep hole to the water drain hole.

According to the present invention, the illumination device configured to emit light toward the outside of the box body is provided in the box body. The periphery of the illumination device is covered by the protective cover, so that the illumination device is protected. The bottom opening is formed in the bottom plate of the box body such that the bottom opening extends through the bottom plate in the thickness direction thereof. The water drain hole is also formed in the bottom plate at a position further toward the outside than the peripheral edge of the bottom opening.

The box body is placed on the main frame with the sealing member interposed therebetween. The sealing member is disposed along the peripheral edge of the bottom opening at a position further toward the inside than the water drain hole. The lid is provided with the weep hole through which the water that collects on the top surface of the lid flows into the box body. The water that flows into the box body through the weep hole is guided to the water drain hole by the protective cover.

In this case, the water that that collects on the top surface of the lid is caused to flow into the box body through the weep hole, and is then guided by the protective cover and drained through the water drain hole. Therefore, a relatively simple structure that drains water from the top surface of the lid can be provided.

If rainwater, washing water, etc., collects on the top surface of the lid, in particular, in a recessed section in which a lock mechanism or a handle is disposed, the hand of the operator will be wet when the operator opens the lid. This causes discomfort to the operator. Such discomfort can be avoided if the weep hole is formed in the recessed section and the water that collects in the recessed portion is caused to flow into the box body. However, in such a case, an additional draining structure must be provided to prevent tools and the like stored in the box body from becoming wet with the water. Therefore, the structure will be complex and the costs will increase.

In contrast, according to the present invention, the protective cover of the illumination device, which is originally installed in the box body, is used as a water guiding plate for guiding the water that flows into the box body through the weep hole to the water drain hole. Therefore, it is not necessary to provide an additional water drain structure in the box body, and the water that collects on the top surface of the lid can be drained with a relatively simple structure.

In addition, since the sealing member is provided in the connecting section between the box body and the main frame, rainwater and the like can be reliably prevented from flowing into the box body from a gap in the connecting section through the bottom opening. In addition, since the water drain hole is positioned further toward the outside than the sealing member, the water that flows into the box body can be drained at a position further toward the outside than the sealing member. In other words, the connecting section between the box body and the main frame is sealed by the sealing member. Therefore, the water drained through the water drain hole is prevented from flowing into the box body again, and the water can be reliably drained.

According to the present invention, preferably, an illumination opening is formed in a side wall of the box body that faces an illumination surface of the illumination device, and the water drain hole is formed in the bottom plate of the box body at a position near the illumination opening.

According to the present invention, the illumination opening is formed in the side wall of the box body at a position opposite the illumination surface of the illumination device. The water drain hole is formed in the bottom plate of the box body at a position near the illumination opening.

In this case, even if rainwater or the like flows into the box body through the illumination opening, the rainwater or the like can be drained to the outside of the box body through the water drain hole formed at a position near the illumination opening. Therefore, the tools and the like stored in the box body can be prevented from rusting from exposure to the water.

BRIEF DESCRIPTION OF THE DRAWINGS

FIG. 7 is a sectional side view illustrating the inner structure of the toolbox.

DESCRIPTION OF THE PREFERRED EMBODIMENT

An embodiment of the present invention will be described below with reference to the drawings. The preferred embodiment described below is basically an example, and is not intended to limit the present invention, the applications thereof, or the uses thereof.

Overall Structure of Construction Machine

Figure 1:
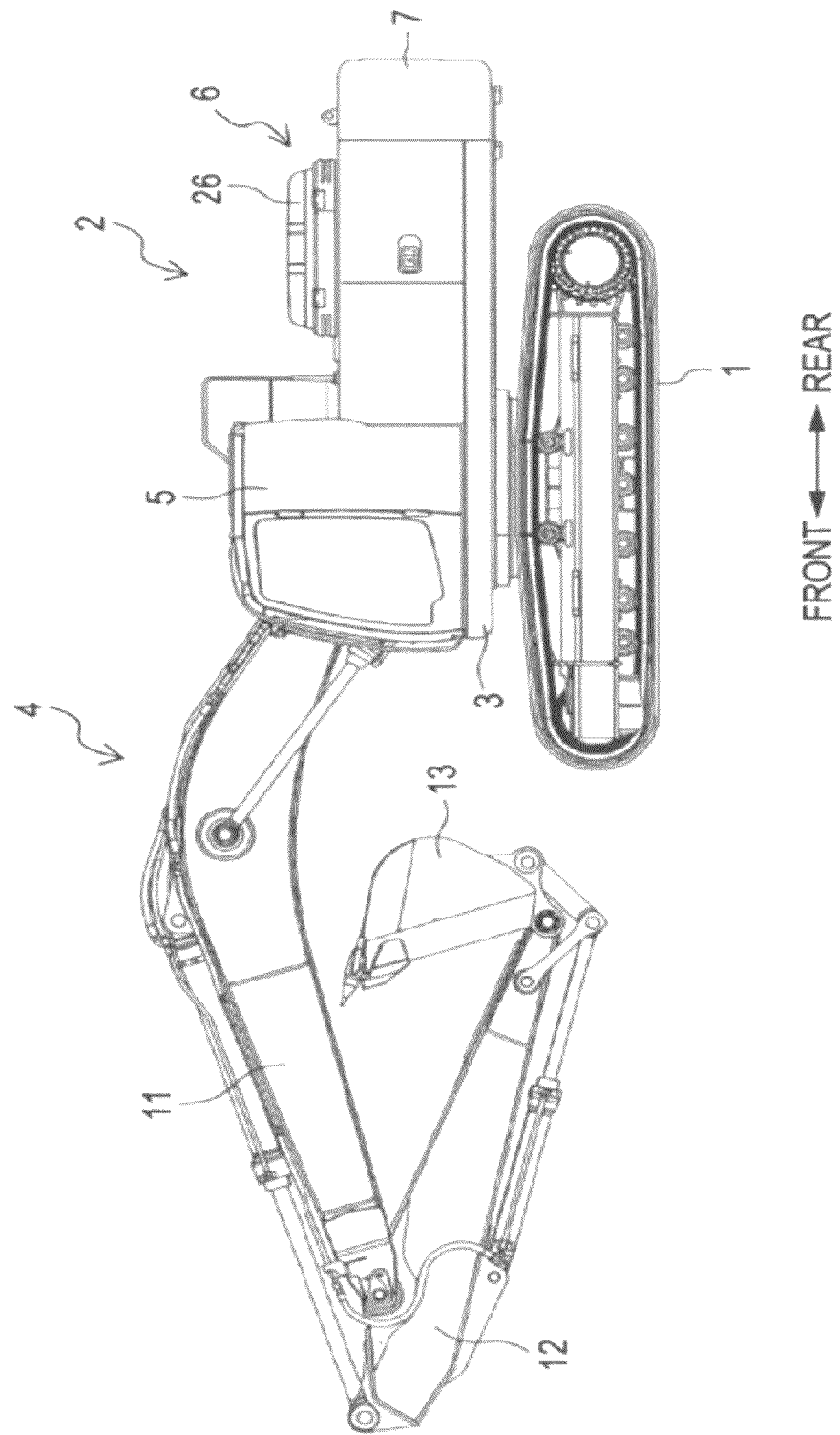
FIG. 1 is a side view illustrating the overall structure of a construction machine to which the present invention is applied.

FIG. 1 is a side view illustrating the overall structure of a construction machine 10 to which the present invention is applied. As shown in FIG. 1, the construction machine 10 is a hydraulic excavator including a crawler-type lower travelling body 1 and an upper rotating body 2 (main frame) mounted on the lower travelling body 1 in a rotatable manner. The upper rotating body 2 includes a main frame 3 and an attachment 4, a cab 5, a machine room 6, a counterweight 7, etc., which are attached to the main frame 3.

In the present embodiment, referring to FIG. 1, the side at which the attachment 4 is disposed, that is, the left side in the figure, is called the front side of the vehicle and the side at which the cab 5 is disposed, that is, the side visible in the figure, is called the left side of the vehicle. The front, rear, left, and right sides described in the following explanation are based on the above-mentioned definitions unless specifically stated otherwise.

The attachment 4 is supported by the upper rotating body 2 at the front center section thereof such that the attachment 4 can be pivoted upward and downward. The attachment 4 includes a boom 11, an arm 12, and a bucket 13. The boom 11 is substantially U-shaped and is supported in a pivotable manner by a pair of vertical plates (not shown) provided on the main frame 3 at a substantially central position thereof. The arm 12 extends in the longitudinal direction of the boom 11 and is supported in a pivotable manner by the boom 11. The bucket 13 is supported in a pivotable manner by the arm 12.

The cab 5 is a rectangular box-shaped driver's cabin in which a driver's seat, various control devices, operation devices, etc., are provided. The cab 5 is disposed in the front left section of the upper rotating body 2 so that the cab 5 is positioned adjacent to the left side of the attachment 4.

Figure 2:
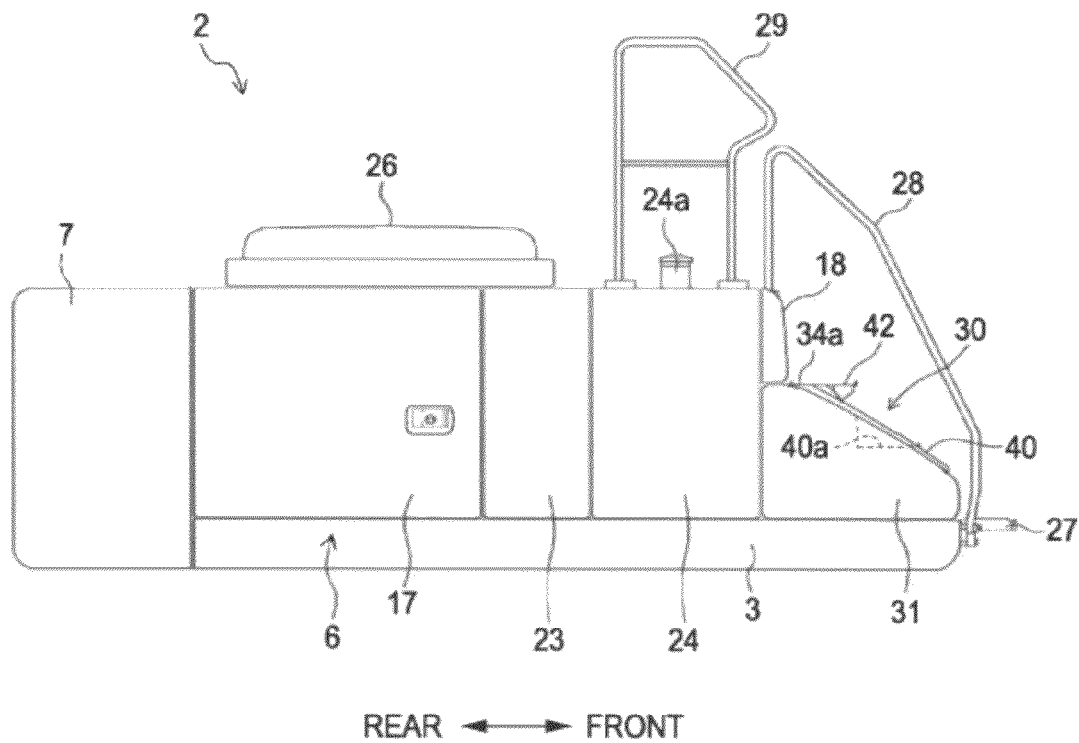
FIG. 2 is a side view illustrating the main section of the construction machine.

The machine room 6 is disposed at the rear section of the upper rotating body 2 so as to extend between the left and right sides of the upper rotating body 2. The counterweight 7 is disposed on the rear side of the machine room 6 so as to extend between the left and right sides of the machine room 6. As shown in FIG. 2, a working oil tank 23 which stores working oil is disposed in the front right section of the machine room 6. In addition, a fuel tank 24 which stores fuel is disposed on the front side of the working oil tank 23. The machine room 6 is covered with a group of main covers 17. A fuel inlet 24a is provided in the upper section of the fuel tank 24.

Figure 3:
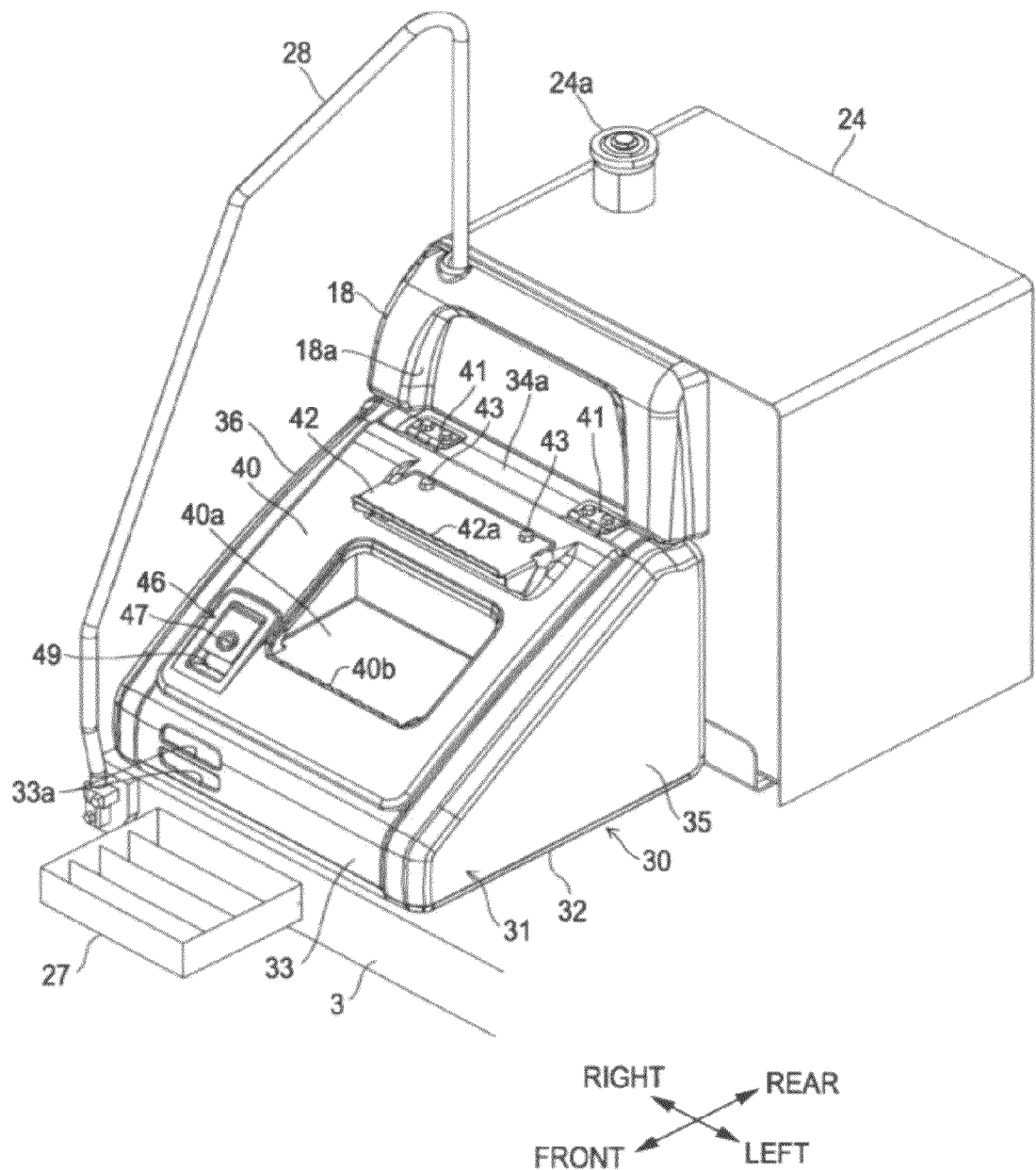
FIG. 3 is a perspective view illustrating the overall structure of a toolbox.

As shown in FIG. 3, a bulging cover 18 which bulges so as to overlap the top surface of a toolbox 30, which will be described below, is provided on the front side of the fuel tank 24 in the upper section thereof. The bulging cover 18 has a recessed section 18a in the front side thereof, so that a lid 40 of the toolbox 30 does not interfere with the bulging cover 18 when the lid 40 is opened toward the fuel tank 24.

A bonnet 26 is proved on the top surface of the upper rotating body 2. The bonnet 26 has a rectangular dome-like shape which bulges upward, and is attached to the upper rotating body 2 such that the bonnet 26 can be opened and closed. Arrangement of an engine and the like are designed such that components that are to be periodically inspected are positioned below the bonnet 26. More specifically, components to be periodically inspected, such as a component to be inspected for water leakage from a radiator, a component to be inspected to check the tension of an engine belt, and a component to be inspected to check a level gauge of engine oil, are collectively placed below the bonnet 26.

The toolbox 30, which can store various tools, is disposed adjacent to the front side of the fuel tank 24. The top surface of the toolbox 30 is inclined upward in a direction from the front side to the rear side, and is positioned below the top surface of the fuel tank 24. A step used by an operator to get onto and off from the top surface of the machine room 6, which is positioned behind the toolbox 30, is formed by the toolbox 30. The structure of the toolbox 30 will be described in detail below.

A step 27 on which the operator places his or her foot first is provided on the main frame 3 at a position in front of and below the toolbox 30 such that the step 27 projects forward.

To assist the operator in climbing up and down the steps, a handrail 28 formed by bending a metal pipe in an arch shape is provided. A lower end portion of the handrail 28 is attached to the main frame 3 at the right corner thereof, and an upper end portion of the handrail 28 is attached to the front surface of the fuel tank 24. The handrail 28 extends substantially in a front-rear direction along the toolbox 30 at the left side of the fuel tank 24.

To ensure the safety of the operator who gets onto the top surface of the fuel tank 24 using the toolbox 30 as a step, a safety bar 29 formed by bending a metal pipe in an inverted U-shape is provided on the top surface of the fuel tank 24.

Toolbox Structure

Figure 4:
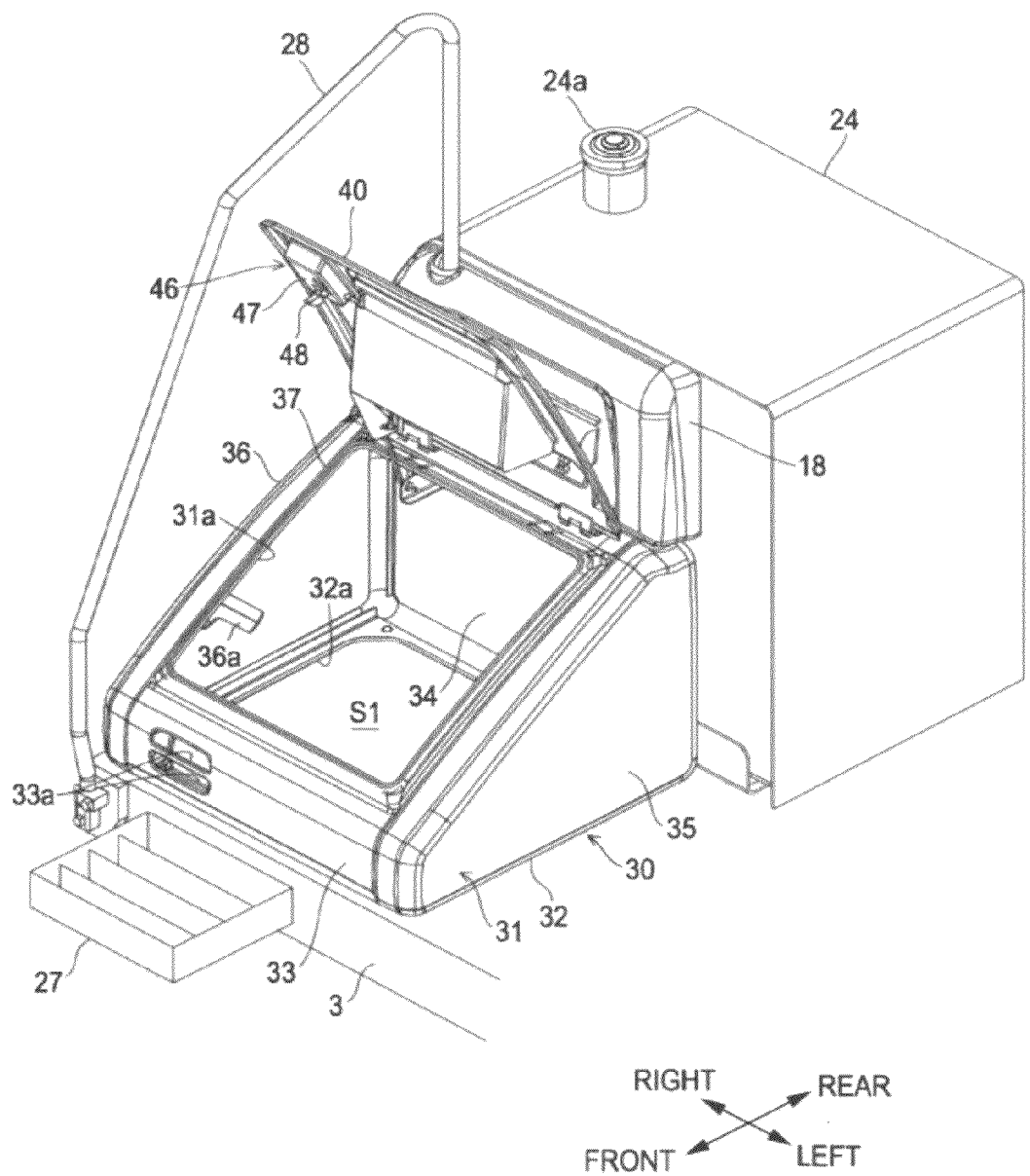
FIG. 4 is a perspective view illustrating the state in which a lid of the toolbox is opened.
Figure 5:
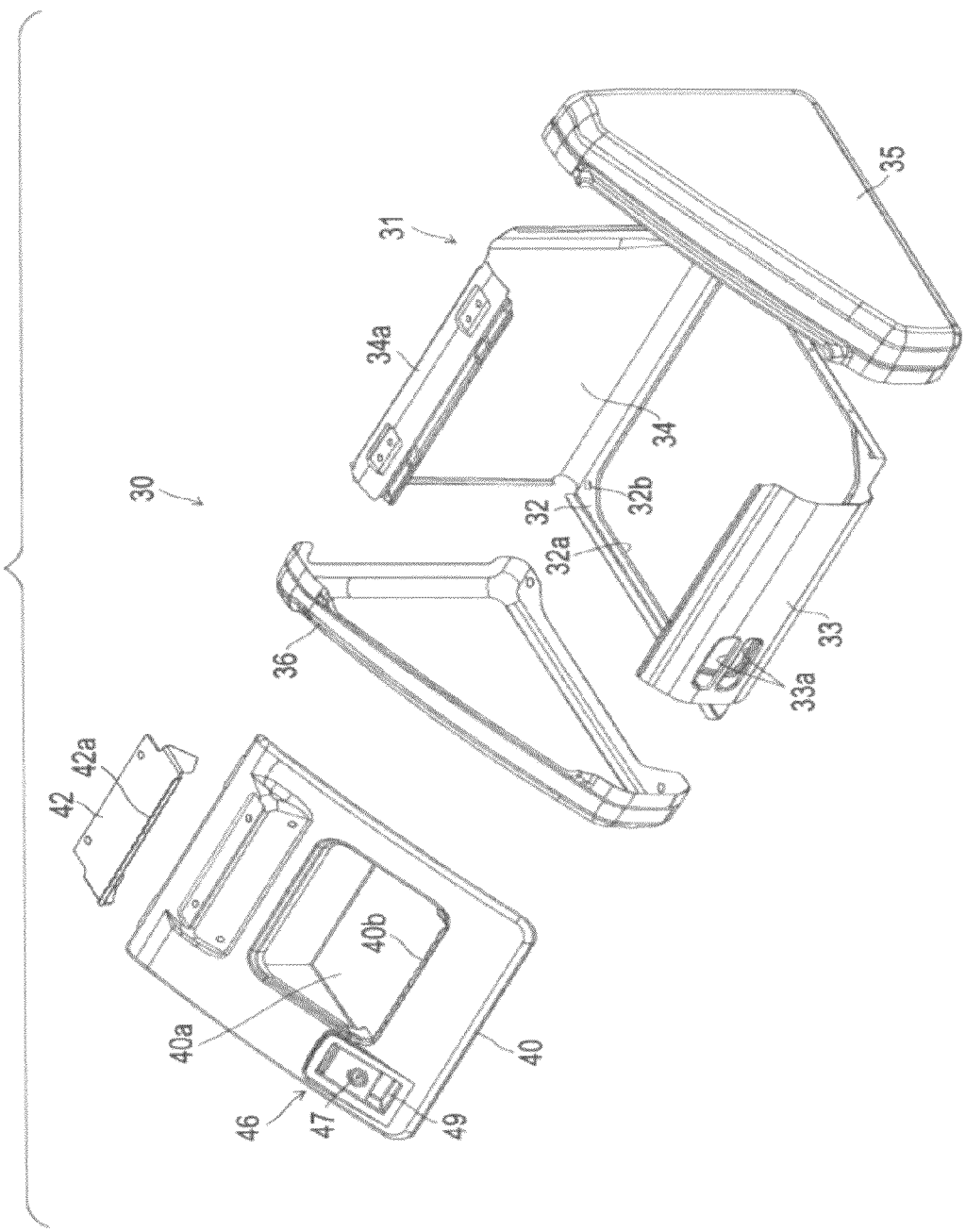
FIG. 5 is an exploded perspective view of the toolbox.

Next, a toolbox structure, which is a characteristic part of the present invention, will be described below. FIG. 3 is a perspective view illustrating the overall structure of the toolbox 30 according to the present embodiment. FIG. 4 is a perspective view illustrating the state in which the lid 40 of the toolbox 30 is opened. FIG. 5 is an exploded perspective view of the toolbox 30. As shown in FIGS. 3 to 5, the toolbox 30 can store various tools, and includes a box body 31 and the lid 40. The box body 31 has a storage space S1 therein and is provided with an opening 31a formed in an upper section of the box body 31. The lid body 40 can open or close the opening 31a in the box body 31. The lid 40 is attached to the box body 31 such that the lid 40 is inclined upward in a direction from the front side to the rear side.

As shown in FIG. 5, the box body 31 is formed in a hollow box shape by combining a bottom plate 32, a front plate 33, a rear plate 34, a left plate 35, and a right plate 36. The front plate 33 and the rear plate 34 are respectively formed by bending front and rear end sections of the bottom plate 32 by press working such that the front plate 33 and the rear plate 34 stand upright. In other words, the bottom plate 32, the front plate 33, and the rear plate 34 are formed integrally with each other from a single metal plate. Since the bottom plate 32, the front plate 33, and the rear plate 34 are formed integrally with each other from a single metal plate, the stability of rigidity can be increased compared to the case in which the plates are bonded together by welding or the like.

The height of the front plate 33 is set to be smaller than the height of the rear plate 34. A top edge portion of the front plate 33 is bent inward so as to extend obliquely upward, thereby forming an inclined surface which continues to the lid 40. A top edge portion of the rear plate 34 is bent inward so as to extend horizontally, thereby forming a part of a step surface of a second step 34a, which will be described below.

The left plate 35 and the right plate 36 are formed in a substantially trapezoidal shape so as to cover the left and right edges of the bottom plate 32, the front plate 33, and the rear plate 34. The peripheral portions of the left plate 35 and the right plate 36 are bent toward the inside of the box by press working. More specifically, the sizes of the bent portions are set such that the bent portions can be fitted to the peripheral portions of the left and right edges of the bottom plate 32, the front plate 33, and the rear plate 34.

After the bent portions of the left plate 35 and the right plate 36 are fitted to the left and right edges of the bottom plate 32, the front plate 33, and the rear plate 34, they are bonded together by welding or the like. As a result, the box-shaped box body 31 is formed.

Thus, the bottom plate 32, the front plate 33, and the rear plate 34 are formed integrally with each other from a single metal plate, and the left plate 35 and the right plate 36 are bonded to the left and right edges of the bottom plate 32, the front plate 33, and the rear plate 34. Therefore, stock control of the components can be facilitated. In the case where the dimension of the toolbox 30 in the width direction differs depending on the kind of the construction machine 10, it is only necessary to change the size of the integrated member (the bottom plate 32, the front plate 33, and the rear plate 34) and the left plate 35 and the right plate 36 can be used as common members. Therefore, the number of kinds of the components can be reduced.

A weather strip 37 made of resin, rubber, etc., having sealing characteristics is provided along the peripheral edge of the opening 31a in the box body 31. More specifically, the four corners of the opening 31a in the box body 31 are formed in an arc shape, and a single, long weather strip 37 is attached along the peripheral edge of the opening 31a. The weather strip 37 is elastically deformed by being pressed when the lid 40 is closed, thereby sealing the gap between the box body 31 and the lid 40.

A bottom opening 32a having a substantially square shape is formed in the bottom plate 32 of the box body 31 so as to extend through the bottom plate 32 in the thickness direction thereof. Attachment holes 32b through which fastening bolts (not shown) are inserted to fix the box body 31 to the main frame 3 are formed at positions near the four corners of the bottom opening 32a.

A stepped section 3a (see FIG. 7) that is recessed from the top surface of the main frame 3 in a step-like shape is provided at a position corresponding to the bottom opening 32a in the box body 31. A sealing member 45 is provided along the periphery of the stepped section 3a. The box body 31 is placed on the main frame 3 with the sealing member 45 interposed therebetween, and the storage space S1 in the box body 31 and a stepped space S2 in the main frame 3 communicate with each other.

In this structure, the stepped space S2 in the stepped section 3a of the main frame 3 can be efficiently used as a storage space in addition to the storage space S1 in the box body 31. Thus, the storage space in the toolbox 30 can be increased. In addition, since the sealing member 45 is provided along the periphery of the bottom opening 32a in the box body 31, rainwater and the like can be reliably prevented from flowing into the box body 31 from the gap in the connecting section between the box body 31 and the main frame 3 through the bottom opening 32a.

Figure 6:
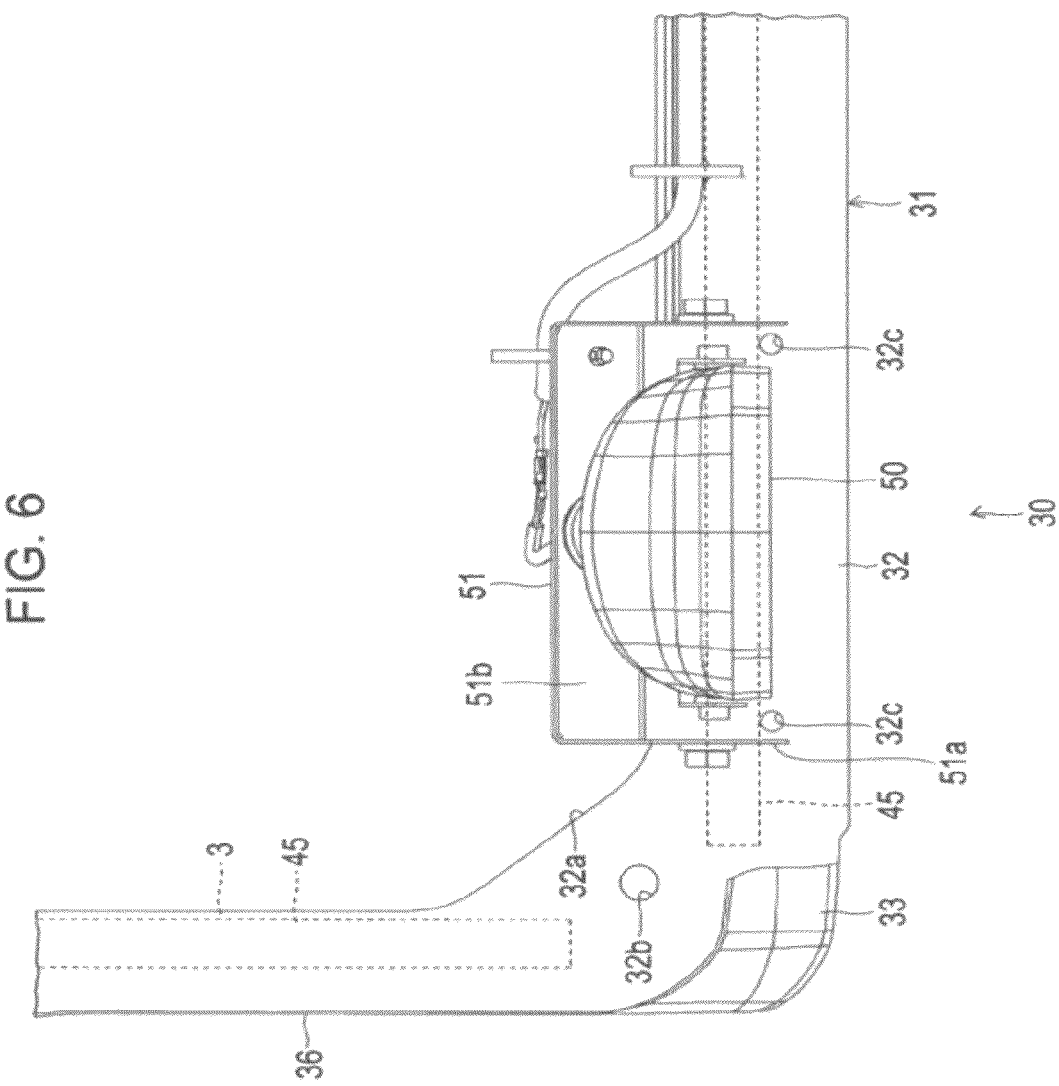
FIG. 6 is a sectional plan view illustrating the inner structure of the toolbox.

FIGS. 6 and 7 are a sectional plan view and a sectional side view, respectively, illustrating the inner structure of the toolbox. As shown in FIGS. 6 and 7, water drain holes 32c are formed in the bottom plate 32 of the box body 31 at positions near the front plate 33 and outside the bottom opening 32a. The water drain holes 32c are used to drain the water that flows into the box body 31 to the outside, and are positioned further toward the outside than the sealing member 45.

The water drained to the outside of the box body 31 through the water drain holes 32c is blocked by the sealing member 45 provided at the connecting section between the box body 31 and the main frame 3 and cannot flow into the box body 31 through the gap in the connecting section again. Thus, the water can be reliably drained.

As shown in FIG. 3, the lid 40 is attached to an upper edge portion of the rear plate 34 of the box body 31 with hinges 41 such that the lid 40 can be opened and closed. Therefore, the lid 40 can be opened by lifting a front portion of the lid 40 upward toward the fuel tank 24. In this state, the tools can be taken out from the toolbox 30. The lid 40 has an inclined surface that is inclined obliquely upward from the front plate 33 to the rear plate 34 of the box body 31.

The lid 40 is provided with a first step 40a having a recessed shape at a substantially central position in the inclining direction thereof. The first step 40a is provided so that the operator can place his or her foot on the first step 40a after the step 27 (see FIG. 2) when the operator gets onto the main frame 3. An irregularly shaped portion 40b is provided at the front edge of the first step 40a to prevent slipping and to allow the operator to scrape off the dirt and the like on the bottom of the shoes.

An auxiliary step plate 42 is attached to the lid 40 at the top edge thereof. The auxiliary step plate 42 constitutes a second step 34a on which the operator can place his or her foot after the first step 40a. The auxiliary step plate 42 projects horizontally and continuously from a part of the second step 34a on the upper section of the rear plate 34 of the box body 31, thereby forming a step surface. Thus, the area of the step surface of the second step 34a can be increased and the safety of the operator who climbs up and down the steps can be effectively ensured.

The auxiliary step plate 42 is detachably attached to the lid 40 by fastening bolts 43. The front edge portion of the auxiliary step plate 42 is bent upward so as to stand upright, and an irregularly shaped portion 42a is formed at the top edge thereof to prevent slipping and to allow the operator to scrape off the dirt and the like on the bottom of the shoes.

A lock mechanism 46 for locking the lid 40 in such a state that the opening 31a in the box body 31 is closed by the lid 40 is disposed on the right side of the first step 40a of the lid 40.

As shown in FIG. 7, the lock mechanism 46 includes a key cylinder 47 and a hook portion 48 which is switchable between an open position and a close position in association with the opening/closing operation of the key cylinder 47.

An engagement plate 36a which projects toward the inside of the box is provided on the right plate 36 of the box body 31 at the upper section thereof. When the hook portion 48 is at the close position, the hook portion 48 and the engagement plate 36a engage with each other to lock the lid 40.

A lock step portion 49 that is recessed in a step-like shape is formed in the lock mechanism 46 at a position in front of the key cylinder 47, so that the operator can easily insert the fingers to open or close the lid 40. A weep hole 49a is formed at the bottom of the lock step portion 49 so as to communicate with the inside of the box body 31.

Since the weep hole 49a is provided at the bottom of the lock step portion 49, rainwater or the like is caused to flow into the box body 31 and is prevented from collecting in the lock step portion 49. Therefore, there is no risk that the hand of the operator will be wet, which causes discomfort to the operator, when the operator opens the lid 40.

As shown in FIGS. 6 and 7, an illumination device 50 which emits light toward the outside of the box body 31 is disposed in the box body 31. More specifically, the illumination device 50 is disposed in the box body 31 at a position near the front plate 33. The front plate 33 has illumination openings 33a at a position opposite the illumination surface of the illumination device 50.

As shown in FIG. 3, the illumination openings 33a are two long holes arranged in the vertical direction with a gap therebetween. Light emitted from the illumination device 50 is directed toward the front of the construction machine 10 through the illumination openings 33a.

The above-described water drain holes 32c are formed in the bottom plate 32 of the box body 31 at positions near the illumination openings 33a. Therefore, even if rainwater or the like flows into the box body 31 through the illumination openings 33a, the rainwater or the like can be drained to the outside of the box body 31 through the water drain holes 32c formed at positions near the illumination openings 33a. Therefore, the tools and the like stored in the box body 31 can be prevented from rusting from exposure to the water.

The periphery of the illumination device 50 is covered by a protective cover 51. More specifically, the protective cover 51 includes a side wall portion 51a that covers the left, right, and rear surfaces of the illumination device 50 and a bottom portion 51b that covers the bottom surface of the illumination device 50. The bottom portion 51b has an inclined surface that is inclined obliquely downward from the rear to the front. A gap is provided between the front edge of the bottom portion 51b and the front plate 33 of the box body 31, so that the water flows along the inclined surface of the bottom portion 51b and is guided to the water drain holes 32c formed in the bottom plate 32 of the box body 31.

All of the front, rear, left, and right sides of the illumination device 50 are covered and protected by the side wall portion 51a of the protective cover 51 and the front plate 33 of the box body 31. The upper section of the illumination device 50 is not covered by the protective cover 51, and is exposed.

The rear end of the side wall portion 51a of the protective cover 51 is positioned behind the weep hole 49a formed in the lock step portion 49 of the lid 40 in a side view. Therefore, the protective cover 51 functions as a water drain plate which receives the water that flows into the box body 31 through the weep hole 49a.

The passages along which rainwater or the like flows into the box body 31 through the weep hole 49a or the illumination openings 33a and is drained through the water drain holes 32c will now be described with reference to FIG. 7. The passages of the water are shown by the arrows with two-dot chain lines.

As shown in FIG. 7, when rainwater or the like collects on the top surface of the lid 40, more specifically, in the lock step portion 49, the water flows into the box body 31 through the weep hole 49a. The water that flows into the box body 31 through the weep hole 49a is received by the protective cover 51 and flows between the side wall portion 51a of the protective cover 51 and the illumination device 50.

The water flows along the side wall portion 51a of the protective cover 51 and is guided forward along the inclined surface of the bottom portion 51b. The water falls from the front edge of the bottom portion 51b, and is drained to the outside of the box body 31 through the water drain holes 32c formed in the bottom plate 32 of the box body 31.

The rainwater or the like also flows into the box body 31 through the illumination openings 33a. The water that flows into the box body 31 through the illumination openings 33a flows downward along the front plate 33 and is drained to the outside of the box body 31 through the water drain holes 32c.

According to the above-described structure, the protective cover 51 of the illumination device 50, which is originally installed in the box body 31, can be used as a water guiding plate for guiding the water that flows into the box body 31 through the weep hole 49a to the water drain holes 32c. Therefore, it is not necessary to provide an additional water drain structure in the box body 31, and the water that collects in the lock step portion 49 of the lid 40 can be drained with a relatively simple structure. Therefore, there is no risk that the hand of the operator will be wet with water, which causes discomfort to the operator, when the operator opens the lid 40.

Although the invention has been described with reference to the preferred embodiments in the attached figures, it is noted that equivalents may be employed and substitutions made herein without departing from the scope of the invention as recited in the claims.

What is claimed is:

1. A toolbox structure of a construction machine, the toolbox structure comprising:

a box body provided on a main frame of the construction machine and a lid, the box body having a storage space therein and being provided with an opening formed in an upper section of the box body, the lid being capable of opening and closing the opening in the box body, an illumination device disposed entirely in the box body and configured to emit light toward the outside of the box body; and a protective cover disposed so as to cover the periphery of the illumination device and protect the illumination device, wherein the box body includes a bottom plate in which a bottom opening and a water drain hole are formed, the bottom opening extending through the bottom plate in a thickness direction thereof to an inner space of the main frame, the water drain hole being formed at a position further toward the outside than a peripheral edge of the bottom opening, wherein the box body is placed on the main frame with a sealing member interposed therebetween, the sealing member being disposed along the peripheral edge of the bottom opening at a position further toward the inside than the water drain hole, wherein the lid is provided with a weep hole through which water that collects on a top surface of the lid flows into the box body, and wherein the protective cover is configured to guide the water that flows into the box body through the weep hole to the water drain hole.

2. The toolbox structure of the construction machine according to claim 1, wherein an illumination opening is formed in a side wall of the box body that faces an illumination surface of the illumination device, and the water drain hole is formed in the bottom plate of the box body at a position near the illumination opening.

3. A toolbox structure provided in a construction machine having a main frame including a stepped space, the toolbox structure comprising:

a box body provided on the main frame of the construction machine to cover the stepped space of the main frame, the box body having sides and a bottom plate for defining a storage space in the box body, an opening formed in an upper section of the box body, the bottom plate being provided with a bottom opening communicating the storage space in the box body with the stepped space of the main frame to provide a combined storage space comprised by the storage space of the box body and the stepped space, a sealing member disposed along the peripheral edge of the bottom opening to seal the box body with respect to the main frame a lid arranged and constructed to close the opening of the box body, the lid being configured to collect water on a top surface thereof, an illumination device disposed entirely in the storage space of the box body and configured to emit light toward the outside of the box body; and a protective cover in the storage space of the box body and disposed so as to cover the periphery of the illumination device and protect the illumination device, a water drain hole formed in the bottom plate of the box body, the water drain hole being formed at a position outward of the sealing member, wherein the lid is provided with a weep hole through which water that collects on a top surface of the lid flows into the box body, and wherein the protective cover in the storage space of the box body is configured to guide the water that flows into the box body via the weep hole to the water drain hole.

4. The toolbox structure of the construction machine according to claim 1, wherein said box body includes a rear plate, a left plate, a right plate, a front plate and said bottom plate, wherein said illumination device faces said front plate and is disposed at a front part of said bottom plate.

5. The toolbox structure of the construction machine according to claim 4, wherein an illumination opening is formed in said front plate of the box body that faces an illumination surface of the illumination device, and the water drain hole is formed in the bottom plate of the box body at a position near the illumination opening.

6. The toolbox structure of the construction machine according to claim 4, wherein said bottom plate, the front plate and the rear plate are integrally formed with each other from a single plate.

7. The toolbox structure of the construction machine according to claim 4, wherein said protective cover includes a side wall portion that covers the left, right, and rear surfaces of the illumination device and a bottom portion that covers the bottom surface of the illumination device, and the rear portion of the protective cover is positioned relative the weep hole formed in the lid such that said protective cover functions as a water drain plate which receives the water that flows into the box body through the weep hole and guides the water to drain out from the water drain hole formed in the bottom plate.

* * * * *

UNITED STATES PATENT AND TRADEMARK OFFICE
CERTIFICATE OF CORRECTION

| | | |
|---|---|---|
| PATENT NO. | : 8,177,387 B2 | |
| APPLICATION NO. | : 12/692948 | |
| DATED | : May 15, 2012 | |
| INVENTOR(S) | : Tsuyoshi Noda et al. | |

It is certified that error appears in the above-identified patent and that said Letters Patent is hereby corrected as shown below:

On the title page, Item (73), the Assignee's name is incorrect. Item (73) should read:

-- (73)    Assignee:    Kobelco Construction Machinery Co., Ltd., Hiroshima-shi (JP) --

Signed and Sealed this
Seventeenth Day of July, 2012

David J. Kappos
*Director of the United States Patent and Trademark Office*